(No Model.)

E. B. BARKER.
HOLDER FOR PHOTOGRAPHIC PAPER NEGATIVES.

No. 343,357. Patented June 8, 1886.

WITNESSES:
C. Neveux
C. Sedgwick

INVENTOR:
E. B. Barker
BY Munn & Co
ATTORNEYS.

UNITED STATES PATENT OFFICE.

ERASTUS B. BARKER, OF NEW YORK, N. Y., ASSIGNOR TO E. & H. T. ANTHONY & CO., OF SAME PLACE.

HOLDER FOR PHOTOGRAPHIC PAPER NEGATIVES.

SPECIFICATION forming part of Letters Patent No. 343,357, dated June 8, 1886.

Application filed December 23, 1885. Serial No. 186,546. (No model.)

*To all whom it may concern:*

Be it known that I, ERASTUS B. BARKER, of the city, county, and State of New York, have invented a new and Improved Holder for Photographic Paper Negatives, of which the following is a full, clear, and exact description.

This invention consists in a holder of novel construction for sensitized paper used in taking photographic negatives, the same being in the form of a slide with attached folding or hinged frame, capable of being entered within the ordinary plate-holder of a camera, or otherwise being projected or entered to its place in the camera, and serving to hold the sensitized paper in position behind the lenses, for taking the photographic picture.

Reference is to be had to the accompanying drawings, forming a part of this specification, in which similar letters of reference indicate corresponding parts in both the figures.

Figure 1:
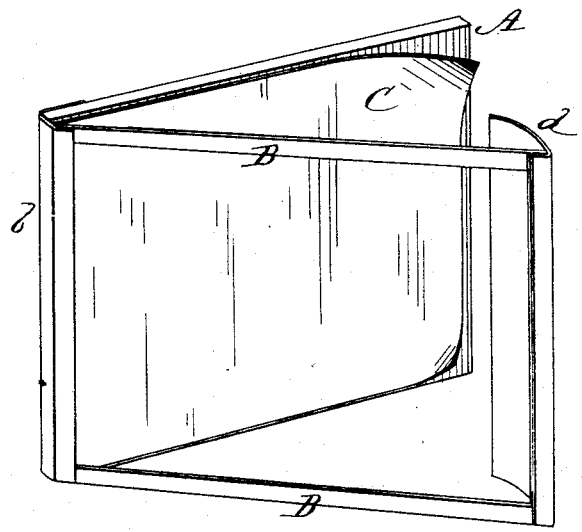
Figure 2:

Figure 1 represents a view in perspective of my improved holder for photographic paper negatives, showing a sheet or piece of said paper in position and the holder as in the act of being closed. Fig. 2 is a transverse horizontal section of the same as it appears when closed on the paper.

A is the back of the holder, of rectangular shape, and which may be of any desired length and width or height, and be made of wood, pasteboard, leather, rubber, or any other suitable material, either rigid or flexible.

B is a hinged front thin marginal frame, arranged to close over or upon the sheet of photographic paper C, for the purpose of holding it in position upon said back or support A, and of exposing said paper in front of the back. This frame, which may also be made of any flexible or rigid material—such as paper, wood, rubber, &c.—is hinged, as by an attached flexible strip, b, or otherwise, at its rear end to the back A, so as to admit of its being opened to admit the paper C and of being folded or closed down or against the paper when in the holder.

Secured to the forward end of the frame B is a flexible strip, d, which may be of cloth, paper, leather, or other suitable flexible material, and may be of the full depth of the marginal frame of the holder. This flexible strip d forms a folding lip or flap, which, after the sensitized paper is placed in the holder, is free to lap over the rear side of the back A, and which, when the holder is fully closed upon the paper, as shown in Fig. 2, and held closed, as by entering or sliding said holder within the usual groove in the ordinary plate-holder of a camera, or within a specially-grooved portion of the camera made to receive my improved holder, will serve to keep the marginal frame B close shut on or over the marginal portions of the sensitized sheet of paper. Thus the paper C is automatically held in position on the holder, and upon drawing out or removing the holder from the camera or its plate-holder, the flap d, being free or loose, readily admits of the negative being taken out of the holder.

Having thus fully described my invention, I claim as new and desire to secure by Letters Patent—

1. The within-described holder for photographic paper negatives, which consists of a support or back for the paper, a marginal front frame attached at one end to said back, and a folding flexible flap at the opposite end of the frame, substantially as specified.

2. In a holder for photographic paper negatives, the combination, with the hinged front marginal plate, B, of the folding flexible flap d, applied to the free or opening and closing end of said frame, substantially as shown and described.

ERASTUS B. BARKER.

Witnesses:
C. SEDGWICK,
JAMES M. HENLEY.